(12) United States Patent
Zhao

(10) Patent No.: US 12,451,188 B2
(45) Date of Patent: Oct. 21, 2025

(54) MEMORY PROGRAMMING METHOD, MEMORY DEVICE, AND MEMORY SYSTEM

(71) Applicant: YANGTZE MEMORY TECHNOLOGIES CO., LTD., Wuhan (CN)

(72) Inventor: Xiangnan Zhao, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 246 days.

(21) Appl. No.: 18/201,685

(22) Filed: May 24, 2023

(65) Prior Publication Data

US 2024/0304247 A1    Sep. 12, 2024

(30) Foreign Application Priority Data

Mar. 8, 2023  (CN) .......................... 202310224095.4

(51) Int. Cl.
| | |
|---|---|
| *G11C 11/34* | (2006.01) |
| *G11C 11/56* | (2006.01) |
| *G11C 16/10* | (2006.01) |
| *G11C 16/34* | (2006.01) |

(52) U.S. Cl.
CPC .......... *G11C 16/10* (2013.01); *G11C 11/5628* (2013.01); *G11C 11/5671* (2013.01); *G11C 16/3459* (2013.01)

(58) Field of Classification Search
CPC ......... G11C 16/10; G11C 16/30; G11C 16/12; G11C 16/0483
USPC .......................... 365/185.18, 185.19, 189.16
See application file for complete search history.

(56) References Cited

U.S. PATENT DOCUMENTS

2012/0170373 A1*  7/2012  Kim .................... G11C 16/3454
                                                    365/185.22

* cited by examiner

*Primary Examiner* — Son T Dinh
(74) *Attorney, Agent, or Firm* — BAYES PLLC

(57) ABSTRACT

The present application discloses a memory programming method, a memory device, and a memory system. The method comprises: performing a plurality periods of first increment step pulse programming (ISPP) on first memory cells to be programmed to a first programmed state, comprising: at a first stage of a first period of the first ISPP, performing programming suppression to the first memory cells; and at a second stage of the first period of the first ISPP, performing pulse programming to the first memory cells. As such, the programming speed of the memory cells corresponding to the first programmed state can be reduced, and a probability of the overprogramming of the memory cells corresponding to the first programmed state can also be reduced.

20 Claims, 6 Drawing Sheets

MEMORY PROGRAMMING METHOD, MEMORY DEVICE, AND MEMORY SYSTEM

CROSS-REFERENCE TO RELATED APPLICATIONS

This application claims the benefit of priority to China Patent Application No. CN 202310224095.4, filed on Mar. 8, 2023, the content of which is incorporated herein by reference in its entirety.

TECHNICAL FIELD

The present application relates to the technical field of data storage, and particularly to a memory programming method, a memory device, and a memory system.

BACKGROUND

A three-dimensional (3D) memory device includes a plurality of memory cells, and types of the memory cells may be divided into single-level cells (SLC), multi-level cells (MLC), trinary-level cells (TLC), and quaternary-level cell (QLC), etc. according to an amount of data capable of being stored by the memory cells. By taking the QLCs as an example, in order to achieve four-bit storage, one page is to be divided into 16 programmed states.

The magnitude of a programming start voltage has a great influence on the number of programming pulses. The higher the programming start voltage is, the smaller the number of programming pulses is, and the shorter the programming time is. However, a high programming start voltage will result in the presence of the problem of overprogramming in a programmed state P1.

SUMMARY

The present application provides a memory programming method, a memory device, and a memory system, which can improve programming efficiency. The technical solutions are as follows:

In one aspect, a memory programming method is provided, which comprises: performing increment step pulse programming (ISPP) on first memory cells to be programmed to a first programmed state, wherein: programming suppression is performed on the first memory cells at first stage of a first programming pulse period of the ISPP; pulse programming is performed on the first memory cells at second stage of the first programming pulse period.

In one implementation, the method further comprises: performing programming suppression on the first memory cells at first stage of a plurality of programming pulse periods of the ISPP; and performing pulse programming on the first memory cells at second stage of the plurality of programming pulse periods.

In one implementation, performing the programming suppression on the first memory cells at the first stage of the first programming pulse period of the ISPP, comprises: performing programming suppression on the first memory cells at the first stage of the first programming pulse period if a programming voltage applied to word lines coupled to the first memory cells is greater than a first preset voltage.

In one implementation, performing the programming suppression on the first memory cells at the first stage of the first programming pulse period of the ISPP, comprises: applying a first voltage to bit lines coupled to the first memory cells and a programming voltage to word lines coupled to the first memory cells, at the first stage of the first programming pulse period; performing the pulse programming on the first memory cells, at the second stage of the first programming pulse period, comprises: applying a second voltage to the bit lines coupled to the first memory cells and the programming voltage to the word lines coupled to the first memory cells, at the second stage of the first programming pulse period; wherein the first voltage is higher than the second voltage.

In one implementation, the method further comprises: performing ISPP on second memory cells to be programmed to a second programmed state, wherein: a second voltage is applied to bit lines coupled to the second memory cells in the first programming pulse period of the ISPP; a threshold voltage of the second programmed state memory cells is greater than a threshold voltage of the first programmed state memory cells.

In one implementation, the method further comprises: performing programming verification on the first memory cells after an ith programming pulse period is finished, i being a positive integer; applying a first voltage to the bit lines coupled to the first memory cells at first stage of an (i+1)th programming pulse period; and applying a voltage to the bit lines coupled to the first memory cells for pulse programming at second stage of the (i+1)th programming pulse period, based on a programming voltage reached by the first memory cells after the ith programming pulse period.

In one implementation, applying the voltage to the bit lines coupled to the first memory cells for pulse programming at the second stage of the (i+1)th programming pulse period, based on the programming voltage reached by the first memory cells after the ith programming pulse period, comprises: applying a second voltage to the bit lines coupled to the first memory cells at the second stage of the (i+1)th programming pulse period if the programming voltage reached by the first memory cells after the ith programming pulse period is less than a first verification voltage; applying a third voltage to the bit lines coupled to the first memory cells at the second stage of the (i+1)th programming pulse period if the programming voltage reached by the first memory cells after the ith programming pulse period is between the first verification voltage and a second verification voltage, where the first verification voltage is less than the second verification voltage, the third voltage is greater than the second voltage, and the third voltage is less than the first voltage; and applying the first voltage to the bit lines coupled to the first memory cells if the programming voltage reached by the first memory cells after the ith programming pulse period is greater than or equal to the second verification voltage.

In one implementation, the first stage is before the second stage in the first programming pulse period; or the first stage is after the second stage in the first programming pulse period.

In another aspect, a memory is provided, which comprises: a memory array and a peripheral circuit; the peripheral circuit is configured to perform increment step pulse programming ISPP on first memory cells to be programmed to a first programmed state, where programming suppression is performed on the first memory cells at first stage of a first programming pulse period of the ISPP, and pulse programming is performed on the first memory cells at second stage of the first programming pulse period.

In one implementation, the peripheral circuit is further configured to perform programming suppression on the first memory cells at first stage of a plurality of programming pulse periods of the ISPP, and perform pulse programming on the first memory cells at second stage of the plurality of programming pulse periods.

In one implementation, the peripheral circuit is further configured to perform programming suppression on the first memory cells at the first stage of the first programming pulse period if a programming voltage applied to word lines coupled to the first memory cells is greater than a first preset voltage.

In one implementation, the peripheral circuit is further configured to apply a first voltage to the bit lines coupled to the first memory cells and a programming voltage to the word lines coupled to the first memory cells, at the first stage of the first programming pulse period; the peripheral circuit is further configured to apply a second voltage to the bit lines coupled to the first memory cells and the programming voltage to the word lines coupled to the first memory cells, at second stage of the first programming pulse period; wherein the first voltage is higher than the second voltage.

In one implementation, the peripheral circuit is further configured to perform ISPP on second memory cells to be programmed to a second programmed state, wherein: a second voltage is applied to bit lines coupled to the second memory cells in the first programming pulse period of the ISPP, where a threshold voltage of the second programmed state memory cells is greater than a threshold voltage of the first programmed state memory cells.

In one implementation, the peripheral circuit is further configured to perform programming verification on the first memory cells after an ith programming pulse period is finished, i being a positive integer; apply a first voltage to the bit lines coupled to the first memory cells at first stage of an (i+1)th programming pulse period; and apply a voltage to the bit lines coupled to the first memory cells for pulse programming at second stage of the (i+1)th programming pulse period, based on a programming voltage reached by the first memory cells after the ith programming pulse period.

In one implementation, the peripheral circuit is further configured to apply a second voltage to the bit lines coupled to the first memory cells at the second stage of the (i+1)th programming pulse period if the programming voltage reached by the first memory cells after the ith programming pulse period is less than a first verification voltage; the peripheral circuit is further configured to apply a third voltage to the bit lines coupled to the first memory cells at the second stage of the (i+1)th programming pulse period if the programming voltage reached by the first memory cells after the ith programming pulse period is between the first verification voltage and a second verification voltage, where the first verification voltage is less than the second verification voltage, the third voltage is greater than the second voltage, and the third voltage is less than the first voltage; the peripheral circuit is further configured to apply the first voltage to the bit lines coupled to the first memory cells if the programming voltage reached by the first memory cells after the ith programming pulse period is greater than or equal to the second verification voltage.

In one implementation, the first stage is before the second stage in the first programming pulse period; or the first stage is after the second stage in the first programming pulse period.

In another aspect, a storage system is provided, which comprises: one or more memories as described in the above implementations, and a memory controller coupled to the memories and configured to control the memories.

In another aspect, an electronic device is provided, which comprises: one or more memories as described in the above implementations, and a memory controller coupled to the memories and configured to control the memories.

The technical solutions provided by the present application may include the following advantageous effects: in a process of programming the first memory cells, for the first programmed state that may lead to overprogramming, two-stage programming is performed on the first memory cells corresponding to the first programmed state, where one stage is to perform programming suppression on the memory cells, and the other stage is to perform pulse programming on the memory cells, thereby reducing a programming speed of the memory cells corresponding to the first programmed state, and if a high programming voltage is applied, a probability of the overprogramming of the memory cells corresponding to the first programmed state can also be reduced.

BRIEF DESCRIPTION OF THE DRAWINGS

The drawings to be used in description of implementations will be briefly introduced below in order to illustrate the technical solutions in the implementations of the present application more clearly. Apparently, the drawings described below are only some implementations of the present application. Those of ordinary skill in the art may obtain other drawings according to these drawings without creative work.

DETAILED DESCRIPTION

Implementations of the present application are further described below in detail in conjunction with the drawings.

A memory programming method provided by implementations of the present application may be applied to a memory device (also referred as "a memory"). The memory may be a 3D memory, for example, may be a 3D NAND flash memory.

Figure 1:
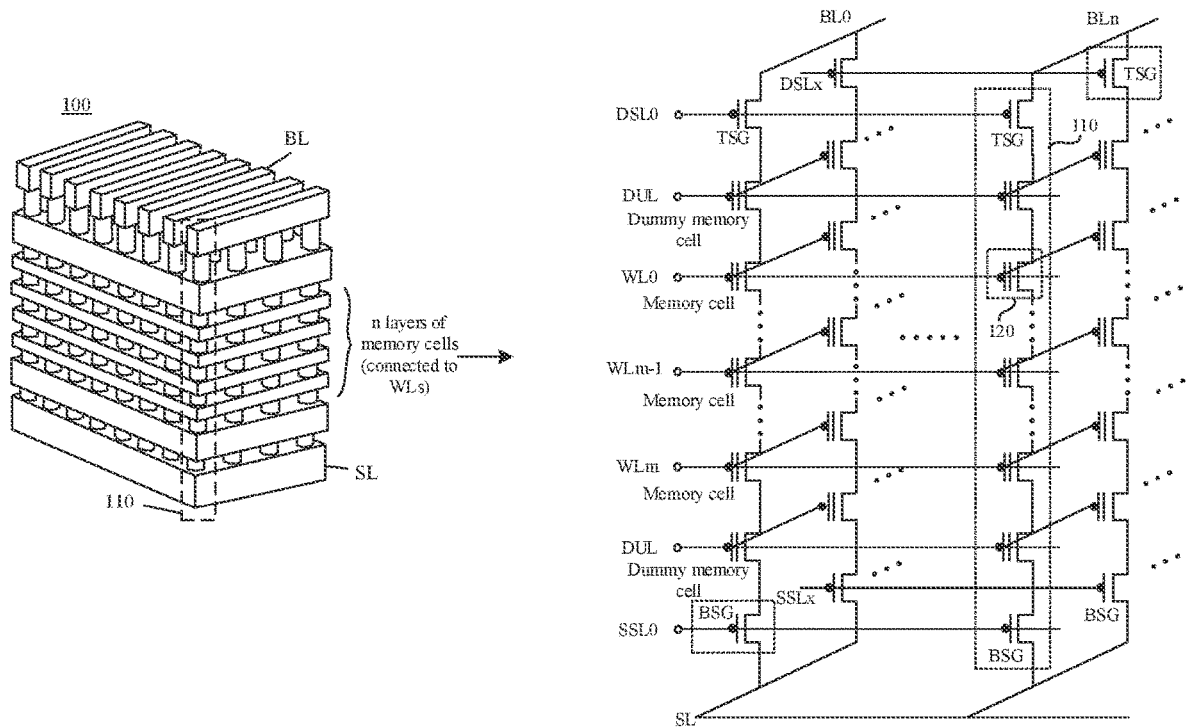
FIG. 1 is a schematic structural diagram of a 3D memory provided by one schematic implementation of the present application.

A three-dimensional (3D) memory is a multi-layer stacked memory. Schematically, the 3D memory is a 3D NAND flash memory. As shown in FIG. 1, a plurality of strings 110 included in the 3D memory 100 are distributed along a direction parallel to a bearing surface of a substrate, and a plurality of memory cells 120 in each string 110 are distributed along a direction perpendicular to the bearing surface of the substrate. That is, the plurality of memory cells included in the 3D memory are distributed in a three-dimensional array on the substrate, and form an array.

The strings 110 are connected with bit lines (BL) at one end, and connected with source lines (SL) at the other end.

The memory cells in each string are further connected with the memory cells in other strings through word lines (WL). For example, each string may comprise 64 memory cells, then the 3D memory may comprise 64 word lines WL<63:0>, and each word line is connected with part of the memory cells on the same layer (i.e., having the same height relative to the substrate). It is noted that the 64 memory cells only represent a specific example, the present application is not limited to this, and in some implementations, each string may comprise more than 64 (e.g., 128, 196, etc.) memory cells. In the 3D memory, various memory cells connected with the same word line are referred to as a page, and all the strings share a set of word lines are referred to as a block.

The strings 110 further comprises upper select transistors connected with drains of first memory cells, and lower select transistors connected with source of last memory cell. The upper select transistors are also called top select gates (TSG) or drain select transistors. The lower select transistors are also called bottom select gates (BSG) or source select transistors.

Gates of the TSGs are connected with drain select lines (DSL), sources of the TSGs are connected with the drains of the first memory cells, and drains of the TSGs are connected with the bit lines.

Gates of the BSGs are connected with source select lines (SSL), drains of the BSGs are connected with source of the last memory cell, and sources of the BSGs are connected with the source lines.

As can be seen from FIG. 1, the memory cells in the string 110 and the memory cells in other strings share a set of WLs. Supposing that each string comprises m+1 memory cells, the 3D memory may comprise m+1 WLs: WL0 through WLm, where m is an integer greater than 1. Each WL is connected with various memory cells on the same layer (i.e., having the same height relative to the bearing surface of the substrate). Alternatively, it may be understood that control gates of various memory cells on the same layer, and a gate connection line between various control gates constitute one WL.

The types of memory cells may be divided into single-level cells (SLC), multi-level cells (MLC), trinary-level cells (TLC), and quaternary-level cell (QLC), etc. according to an amount of data capable of being stored by the memory cells. Each SLC can store 1 bit of data, each MLC can store 2 bits of data, each TLC can store 3 bits of data, and each QLC can store 4 bits of data. In the 3D memory, the data stored in various memory cells on the same layer may constitute k pages, where k is the number of bits of data capable of being stored by each memory cell.

In the implementations of the present application, the memory cells in the 3D memory may be field effect transistors capable of storing data, such as floating gate field effect transistors or charge trap field effect transistors, etc. The TSGs and the BSGs may be either ordinary field effect transistors, or field effect transistors capable of storing data. The floating gate field effect transistor comprises a source, a drain and two gates. The two gates are conductors, and one of the two gates is a control gate (CG), and the other one is a floating gate (FG). The control gate is used to connect the word lines, and the floating gate is used to store data. The charge trap field effect transistors comprise sources, drains, control gates and charge trap layers, where the charge trap layers are cells for storing data, and are made of insulating materials, such as silicon nitride. A data writing principle of the memory cells is introduced below by taking the floating gate field effect transistors as an example.

When data is written to the memory cells, a programming voltage may be loaded to control gates of the floating gate field effect transistors to cause electrons in channels of the floating gate field effect transistors to tunnel to floating gates. The number of electrons tunneling to the floating gates can be controlled by controlling a magnitude of the programming voltage, so as to further control a magnitude of a threshold voltage Vth of the floating gate field effect transistors. Generally, the higher the quantity of charge stored in the floating gates is, the higher the threshold voltage Vth of the floating gate field effect transistors is. It can be understood that when the threshold voltages Vth of the floating gate field effect transistors are different, the voltages to be loaded to the control gates of the floating gate field effect transistors to control the floating gate field effect transistors to turn on are different. Therefore, the magnitude of the threshold voltage Vth of the floating gate field effect transistors may reflect contents of data stored in the memory cells.

It is to be understood that, in the 3D memory, channels of various memory cells in each string may be connected sequentially, and form a pillar-shaped structure perpendicular to the substrate.

At present, a programming mode mainly employed in the programming of the memory is an increment step pulse programming (ISPP) mode, where the voltage is not applied in place all at once when the programming voltage is applied in a programming process. Instead, the programming voltage is increased step by step incrementally.

Figure 2:
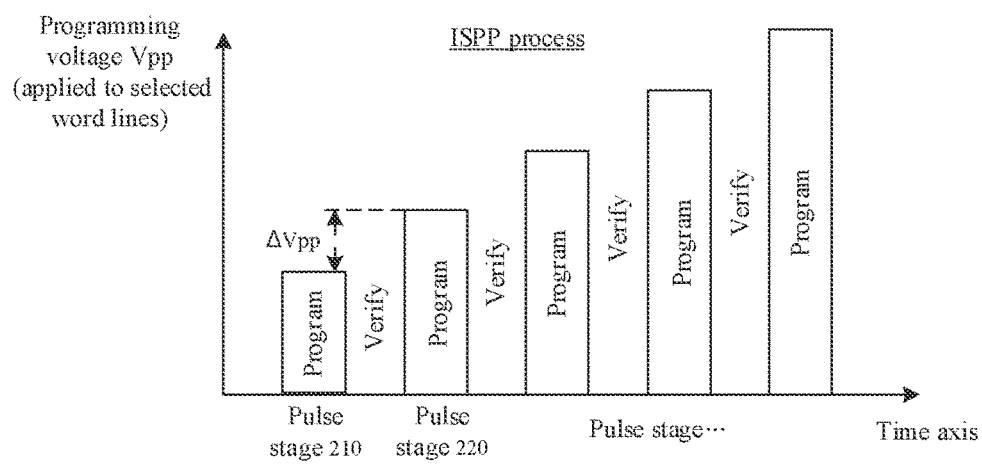
FIG. 2 is a schematic diagram of increment step pulse programming provided by one schematic implementation of the present application.

Schematically, referring to FIG. 2, FIG. 2 illustrates a schematic diagram of ISPP provided by one implementation of the present application. As shown in FIG. 2, the programming process includes a programming stage and a verification stage. For a NAND type memory, a write operation is performed in pages when the write operation is performed using the increment step pulse programming. By taking some memory cell in one page as an example, after the programming is started, at a first programming pulse stage 210, a start programming voltage Vpgm is loaded to a word line coupled to the memory cell, and then a programming verification voltage Vvf0 is loaded to the word line coupled to the memory cell to verify whether it is programmed to a target threshold voltage; if the target threshold voltage is not reached, it is programmed with a voltage higher than the start programming voltage by a preset voltage Vispp at a second programming pulse stage 220, and then a programming verification voltage Vvf1 is loaded to verify whether it is programmed to the target threshold voltage; the above process is repeated until the threshold voltage of the memory cell is found to have been programmed to reach the target threshold voltage in a verification step; and at this time, the programming of the memory cell is finished. In subsequent time, a programming suppression voltage is applied to the bit line coupled to the memory cell to cause the memory cell not to be programmed any longer, and when the threshold voltages of all of the memory cells on this page are programmed to the target threshold voltage, the programming process of the whole page is finished. A narrower final threshold voltage distribution may be obtained by programming through the above increment step pulse programming mode.

When the programming is performed on the memory, for example, the MLC may be configured to store two digits of data represented by four Vth ranges (programmed states) per memory cell, the TLC may be configured to store three digits of data represented by eight Vth ranges (programmed states) per memory cell, the QLC may be configured to store four digits of data represented by sixteen Vth ranges (programmed states) per memory cell, and so on.

For example, when the 3D NAND flash is an MLC flash, the memory cells of the 3D NAND flash may be programmed into four states corresponding to bit codes 11, 10, 01 and 00, i.e., an erased state E0, and programmed states P1, P2 and P3. In another implementation, when the 3D NAND flash is a TLC 3D NAND flash, the memory cells of the 3D NAND flash may be programmed into eight programmed states corresponding to bit codes 111, 110, 010, 011, 001, 000, 100 and 101.

It is worth noting that, the magnitude of the programming voltage has a great influence on the number of programming pulses. The higher the programming voltage is, the smaller the number of the programming pulses is, and the shorter the programming time is. However, a high programming voltage will result in the presence of the problem of overprogramming in the programmed state P1.

Figure 3:
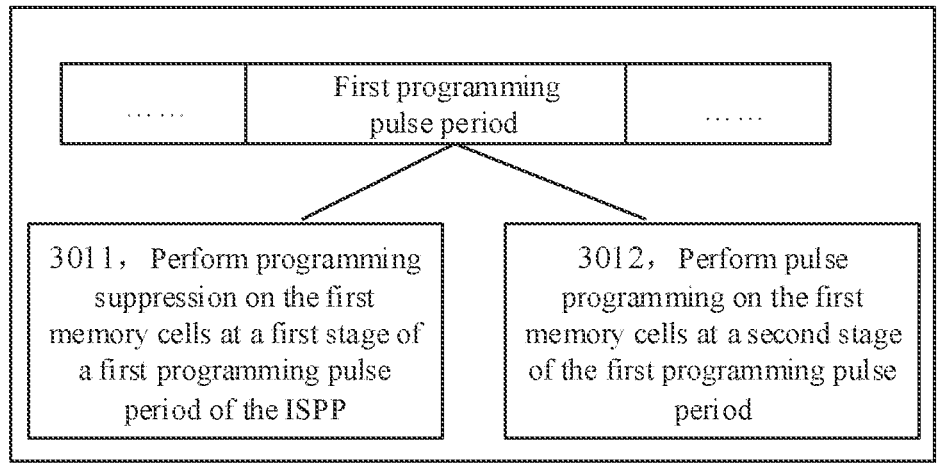
FIG. 3 is a flow diagram of a programming method of a memory provided by one implementation of the present application.

In the implementations of the present application, the following programming method of the memory is provided for the above situation. As shown in FIG. 3, FIG. 3 shows a flow diagram of a programming method of a memory provided by one implementation of the present application. The method comprises the following steps.

At step 301, performing increment step pulse programming on first memory cells to be programmed to a first programmed state.

The first programmed state refers to a programmed state to which a memory cell in the memory that has the overprogramming problem due to the influence of the programming voltage in the programming process is to be programmed. In some implementations, the first programmed state is a next programmed state of an erased state. Schematically, when the erased state is E0, the first programmed state is P1.

One or more memory cells, that are memory cells to be programmed to the first programmed state, exist in one page in the memory. That is, one or more first memory cells, that are connected to word lines WL and bit lines BL respectively for pulse programming, exist in one page. The ISPP process includes a plurality of programming pulse periods.

In the implementations of the present application, the first memory cells in the memory are memory cells currently to be programmed to the first programmed state, and the first memory cells are programmed to the first programmed state by means of the ISPP.

Performing the ISPP on the first memory cells comprises the following steps:

At step 3011, performing programming suppression on the first memory cells at first stage of a first programming pulse period of the ISPP.

The first programming pulse period is one or more of a plurality of programming pulse periods in the ISPP process. In some implementations, the programming suppression is performed on the first memory cells at first stage of the plurality of programming pulse periods of the ISPP. In some implementations, the programming suppression is performed on the first memory cells at the first stage of each programming pulse period of the ISPP.

The first stage is part of a time period of the first programming pulse period. Schematically, the first stage is a part of a time period lasting from a start moment of the first programming pulse period; alternatively, the first stage is a time period lasting from any moment in a period of the first programming pulse period as a start moment to an end moment of the first programming pulse period; alternatively, the first stage is a time period lasting for a preset duration from any moment in a period of the first programming pulse period as a start moment.

Schematically, the start moment of the first programming pulse period is $t_0$, the end moment is $t_1$, and then the first stage includes at least one of the following situations: 1. the start moment of the first stage is $t_0$, the end moment is $t_2$, and $t_2$ is between $t_0$ and $t_1$; 2. the start moment of the first stage is $t_3$, the end moment is $t_1$, and $t_3$ is between $t_0$ and $t_1$; and 3. the start moment of the first stage is $t_4$, the end moment is $t_5$, $t_4$ is between $t_0$ and $t_5$, and $t_5$ is between $t_4$ and $t_1$. It is worth noting that the above time period ranges of the first stage are schematic examples, and this implementation does not impose limitations in this regard.

In some implementations, the first memory cells are memory cells, the programming voltage applied to the word lines coupled to which is greater than a first preset voltage. That is, the programming suppression is performed on the first memory cells at the first stage of the first programming pulse period if the programming voltage applied to the word lines coupled to the first memory cells is greater than the first preset voltage.

Since the first memory cells are memory cells to be programmed to the first programmed state, the programming voltage is applied to the word lines coupled to the first memory cells, while at the first stage of the first programming pulse period, since the programming suppression can be performed on the first memory cells, the programming suppression is performed on the first memory cells by applying a first voltage to the bit lines coupled to the first memory cells in the implementations of the present application. That is, at the first stage of the first programming pulse period of the ISPP, the first voltage is applied to the bit lines coupled to the first memory cells, and the programming voltage is applied to the word lines coupled to the first memory cells, thereby performing the programming suppression on the programming voltage through the first voltage. The programming voltage applied to the word lines coupled to the first memory cells is used to cause electrons in channels to be driven by the voltage to move into the memory cells, while the first voltage applied to the bit lines coupled to the first memory cells is used to reduce a voltage difference with the channels, thereby preventing the electrons from moving into the memory cells from the channels to achieve the programming suppression for the first memory cells.

At step 3012, performing pulse programming on the first memory cells at second stage of the first programming pulse period.

In some implementations, the pulse programming is performed on the first memory cells at second stage of the plurality of programming pulse periods of the ISPP. In some implementations, the pulse programming is performed on the first memory cells at the second stage of each programming pulse period of the ISPP.

The second stage is part of a time period of the first programming pulse period. Schematically, the second stage is a part of a time period lasting from a start moment of the first programming pulse period; alternatively, the second stage is a time period lasting from any moment in a period of the first programming pulse period as a start moment to an end moment of the first programming pulse period; alternatively, the second stage is a time period lasting for a preset duration from any moment in a period of the first programming pulse period as a start moment.

In some implementations, the second stage is a stage in the first programming pulse period except the first stage. Alternatively, the second stage is part of time period in time periods except the first stage in the first programming pulse period. In the implementations of the present application, the illustration is made by taking the second stage being a stage in the first programming pulse period except the first stage as an example.

In some implementations, the first stage is before the second stage in the first programming pulse period, or the first stage is after the second stage in the first programming pulse period.

Schematically, the start moment of the first programming pulse period is $t_0$, the end moment is $t_1$, and then the first stage and the second stage include at least one of the following situations: 1. the start moment of the first stage is $t_0$, and the end moment of the first stage is $t_2$; the start moment of the second stage is $t_2$, and the end moment of the second stage is $t_1$; 2. the start moment of the first stage is $t_3$, and the end moment of the first stage is $t_1$; the start moment of the second stage is $t_0$, and the end moment of the second stage is $t_3$; and 3. the start moment of the first stage is $t_4$, and the end moment of the first stage is $t_5$; and the second stage is another time period than the time period from $t_4$ to $t_5$ in the first programming pulse period. It is worth noting that the above time period ranges of the first stage and the second stage are schematic examples, and this implementation does not impose limitations in this regard.

In some implementations, the first memory cells are memory cells, the programming voltage applied to the word lines coupled to which is greater than a first preset voltage. That is, the programming suppression is performed on the first memory cells at the first stage of the first programming pulse period, and the pulse programming is performed on the first memory cells at the second stage of the first programming pulse period, if the programming voltage applied to the word lines coupled to the first memory cells is greater than the first preset voltage.

Since the first memory cells are memory cells to be programmed to the first programmed state, the programming voltage is applied to the word lines coupled to the first memory cells. At the first stage of the first programming pulse period, since the programming suppression can be performed on the first memory cells, the programming suppression is performed on the first memory cells by applying a first voltage to the bit lines coupled to the first memory cells in the implementations of the present application, while at the second stage of the first programming pulse period, since the pulse programming can be performed on the first memory cells, the pulse programming is achieved by applying a second voltage to the bit lines coupled to the first memory cells. That is, at the second stage of the first programming pulse period of the ISPP, the second voltage is applied to the bit lines coupled to the first memory cells, and the programming voltage is applied to the word lines coupled to the first memory cells, thereby performing the pulse programming on the programming voltage through the second voltage. It is worth noting that the first voltage is higher than the second voltage.

Figure 4:
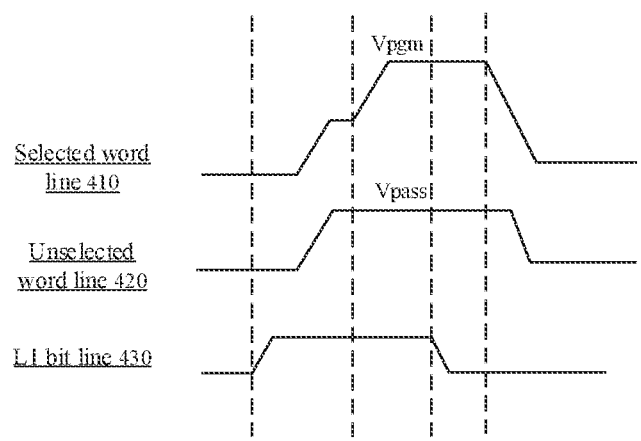
FIG. 4 is a schematic diagram of pulse programming voltage application provided by one implementation of the present application.

Schematically, referring to FIG. 4, FIG. 4 illustrates a schematic diagram of a voltage application method provided by one implementation of the present application. As shown in FIG. 4, for the first memory cells to be programmed to the first programmed state P1, a programming voltage Vpgm is applied to a selected word line 410 coupled to the first memory cells, and a voltage Vpass is applied to an unselected word line 420 coupled to other memory cells not to be programmed. In addition, for an L1 bit line 430 coupled to the first memory cells, a high voltage is applied at the first stage of programming pulse period, and a low voltage is applied at the second stage to perform the programming suppression through the high voltage and achieve the pulse programming through the low voltage.

To sum up, for the programming method provided by this implementation, in the process of programming the first memory cells, for the first programmed state that may lead to overprogramming, two-stage programming is performed on the first memory cells corresponding to the first programmed state, where one stage is to perform the programming suppression on the memory cells, and the other stage is to perform the pulse programming on the memory cells, thereby reducing a programming speed of the memory cells corresponding to the first programmed state. if a high programming voltage is applied, the probability of the overprogramming of the memory cells corresponding to the first programmed state can also be reduced.

Figure 5:
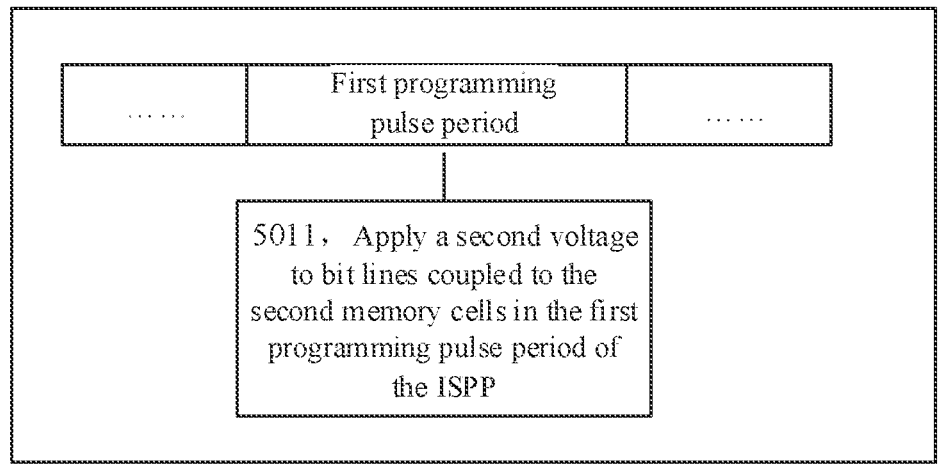
FIG. 5 is a flow diagram of a programming method of a memory provided by another implementation of the present application.

In some implementations, the MLC, TLC or QLC has multiple programmed states, and the above first programmed state is only one or part of the multiple programmed states. In some implementations, the multiple programmed states also include a second programmed state, and the second memory cells to be programmed to the second programmed state do not have the situation of overprogramming. FIG. 5 is a flow diagram of a programming method provided by another implementation of the present application. As shown in FIG. 5, the method comprises the following steps.

At step 501, performing ISPP on second memory cells to be programmed to a second programmed state.

The threshold voltage of the second programmed state memory cells is greater than a threshold voltage of the first programmed state memory cells.

In some implementations, the second programmed state is another programmed state than an erased state and a next programmed state of the erased state. Schematically, when the erased state is E0, the first programmed state is P1, and the second programmed state is a programmed state of P2 or above.

One or more memory cells that are memory cells to be programmed to the second programmed state exist in one page in the memory. That is, one or more second memory cells exist in one page, the plurality of second memory cells in one page are connected to the same word line WL, and the plurality of second memory cells in one page are connected to a plurality of bit lines BL respectively. The pulse programming is performed on the plurality of second memory cells through the programming voltage applied to the coupled word line WL. The ISPP process includes a plurality of programming pulse periods.

In the implementations of the present application, the second memory cells in the memory are memory cells currently to be programmed to the second programmed state, and the second memory cells are programmed to the second programmed state by means of the ISPP.

Performing the ISPP on the second memory cells comprises the following steps:

At step S011, applying a second voltage to bit lines coupled to the second memory cells in the first programming pulse period of the ISPP.

Since the second voltage does not generate suppression for the programming of the memory cells, the second voltage is applied to the bit lines coupled to the second memory cells in the first programming pulse period of the ISPP, and the programming voltage is applied to the word lines coupled to the second memory cells, thereby performing the pulse programming on the second memory cells.

In some implementations, the memory further includes memory cells corresponding to the erased state. Since the memory cells corresponding to the erased state are not to be programmed, the programming suppression is maintained for the memory cells corresponding to the erased state in the process of the ISPP. That is, the first voltage is applied to bit lines coupled to the memory cells corresponding to the erased state for programming suppression.

Figure 6:
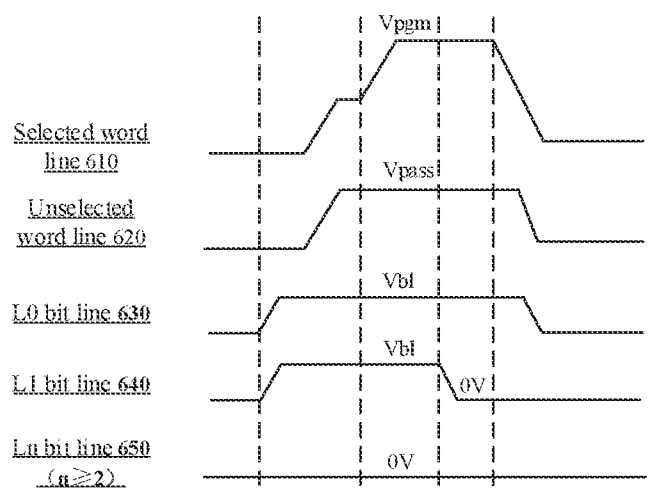
FIG. 6 is a schematic diagram of pulse programming voltage application provided by one implementation of the present application.

Schematically, referring to FIG. 6, FIG. 6 illustrates a schematic diagram of a voltage application method provided by one implementation of the present application. As shown in FIG. 6, when the programming can be performed, a programming voltage Vpgm is applied to a selected word line 610 corresponding to the memory cells to be programmed in the memory, and a voltage Vpass is applied to an unselected word line 620 coupled to the other memory cells not to be programmed. For the memory cells corresponding to the erased state, a high voltage Vb1 is applied to an L0 bit line 630 coupled with the memory cells to suppress the pulse programming of the memory cells corresponding to the erased state; for the first memory cells to be programmed to the first programmed state P1, a high voltage Vb1 that is a bit line voltage for performing the programming suppression on the first memory cells is applied to an L1 bit line 640 coupled with the first memory cells at the first stage of the programming pulse period, and a low voltage 0V is applied at the second stage to perform the programming suppression through the high voltage and to achieve the pulse programming through the low voltage; for the second memory cells to be programmed to the second programmed state Pn, the low voltage 0V is applied to an Ln bit line 650 coupled with the second memory cells in the programming pulse period to achieve the pulse programming through the low voltage, where n≥2, and a maximum value of n is related to type division of the memory cells.

Figure 7:
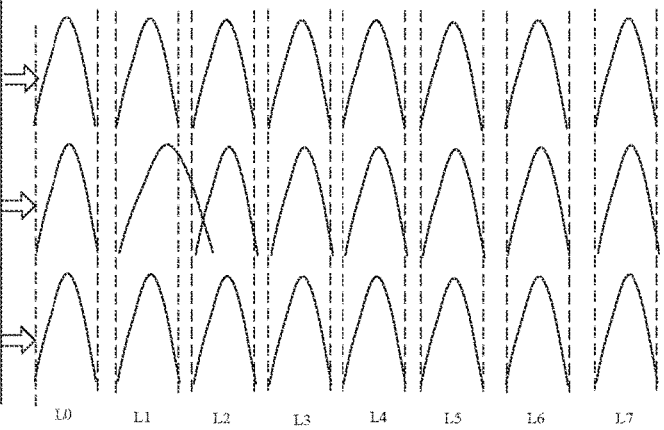
FIG. 7 is a schematic diagram of pulse programming voltage application provided by another implementation of the present application.

Schematically, as shown in FIG. 7, in order to enable better distinguish each programmed state and ensure the reliability of the flash, a step voltage of a multi-value storage during the programming needs to be reduced to ensure that each state has a relatively narrow threshold voltage distribution, which results in an increase of the number of programming pulses and verifications for completing one programming, causes the entire programming time to be increasingly long as well and leads to the reduction of the performance; therefore, an additional voltage is added based on the default voltage to reduce the number of programming pulses and verifications. As shown in FIG. 7, in the situation 710, the default voltage is applied to the word lines coupled to the various memory cells, and the 0V voltage is applied to the bit lines coupled to the various memory cells to perform the pulse programming on the memory cells corresponding to different programmed states, but the number of programming pulses and verifications increases; in the situation 720, the default voltage and the additional voltage are applied to the word lines coupled to the various memory cells, and the 0V voltage is applied to the bit lines coupled to the various memory cells to perform the pulse programming on the memory cells corresponding to the different programmed states, but the programmed state P1 has the problem of overprogramming; and in the situation 730, the default voltage and the additional voltage are applied to the word lines coupled to the various memory cells, and the voltage application for the two-step programming is performed on the bit lines coupled to the memory cells corresponding to the programmed state P1, thereby avoiding the problem of overprogramming of the memory cells corresponding to the programmed state P1.

To sum up, for the programming method provided by this implementation, in the process of programming the first memory cells, for the first programmed state that may lead to overprogramming, two-stage programming is performed on the first memory cells corresponding to the first programmed state, where one stage is to perform the programming suppression on the memory cells, and the other stage is to perform the pulse programming on the memory cells, thereby reducing a programming speed of the memory cells corresponding to the first programmed state. If a high programming voltage is applied, the probability of the overprogramming of the memory cells corresponding to the first programmed state can also be reduced.

The programming method provided by this implementation performs the programming suppression on the memory cells corresponding to the erased state, performs the programming suppression and pulse programming by stages on the first memory cells to be programmed to the first programmed state, and perform the normal pulse programming on the second memory cells to be programmed to the second programmed state, thereby preventing the first memory cells from producing the overprogramming and causing no influence on the programming of the second memory cells.

Figure 8:
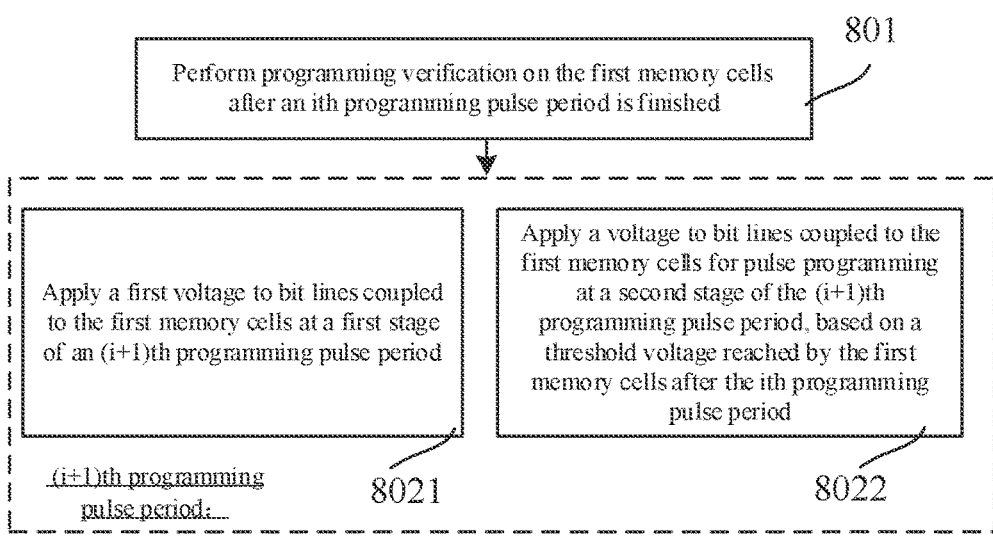
FIG. 8 is a flow diagram of a programming method of a memory provided by another implementation of the present application.

In some implementations, the pulse programming is performed on the first memory cells at the second stage of the programming pulse period by performing the programming verification on the first memory cells. FIG. 8 is a flow diagram of a programming method provided by another implementation of the present application. As shown in FIG. 8, the method comprises the following steps.

At step 801, performing programming verification on the first memory cells after an ith programming pulse period is finished.

In the ISPP process, a verification stage exists after completing the application of the programming voltage of each programming pulse period to perform verification on a threshold voltage reached by the memory cells after the application of the programming voltage.

In some implementations, after the ith programming pulse period is finished, a verification voltage is applied to the word lines coupled to the first memory cells to perform programming verification on the first memory cells.

At step 8021, applying a first voltage to the bit lines coupled to the first memory cells at first stage of an (i+1)th programming pulse period.

The first stage is part of a time period of the (i+1)th programming pulse period. Schematically, the first stage is a part of a time period lasting from a start moment of the (i+1)th programming pulse period; alternatively, the first stage is a time period lasting from any moment in a period of the (i+1)th programming pulse period as a start moment to an end moment of the first programming pulse period;

alternatively, the first stage is a time period lasting for a preset duration from any moment in a period of the (i+1)th programming pulse period as a start moment.

The programming suppression is performed on the first memory cells at the first stage of the (i+1)th programming pulse period if a programming voltage applied to the word lines coupled to the first memory cells is greater than a first preset voltage.

Since the first memory cells are memory cells to be programmed to the first programmed state, the programming voltage is applied to the word lines coupled to the first memory cells, while at the first stage of the (i+1)th programming pulse period, since the programming suppression can be performed on the first memory cells, the programming suppression is performed on the first memory cells by applying the first voltage to the bit lines coupled to the first memory cells in the implementations of the present application. That is, at the first stage of the (i+1)th programming pulse period of the ISPP, the first voltage is applied to the bit lines coupled to the first memory cells, and the programming voltage is applied to the word lines coupled to the first memory cells, thereby performing the programming suppression on the programming voltage through the first voltage. The programming voltage applied to the word lines coupled to the first memory cells is used to cause electrons in channels to be driven by the voltage to move into the memory cells, while the first voltage applied to the bit lines coupled to the first memory cells is used to reduce a voltage difference with the channels, thereby preventing the electrons from moving into the memory cells from the channels to achieve the programming suppression for the first memory cells.

At step 8022, applying a voltage to the bit lines coupled to the first memory cells for pulse programming, at second stage of the (i+1)th programming pulse period, based on a threshold voltage reached by the first memory cells after the ith programming pulse period.

In some implementations, applying the voltage to the bit lines coupled to the first memory cells at the second stage of the (i+1)th programming pulse period includes at least one of the following situations:

First, a second voltage is applied to the bit lines coupled to the first memory cells at the second stage of the (i+1)th programming pulse period if the threshold voltage Vth reached by the first memory cells after the ith programming pulse period is less than a first verification voltage; wherein if the threshold voltage Vth reached by the first memory cells is less than the first verification voltage after the ith programming pulse period, it means that a programming speed of the first memory cells is slow, and therefore, the second voltage is applied to the bit lines coupled to the first memory cells at the second stage to prevent the voltage applied to the bit lines from influencing the programming speed of the first memory cells.

Second, a third voltage is applied to the bit lines coupled to the first memory cells at the second stage of the (i+1)th programming pulse period if the threshold voltage Vth reached by the first memory cells after the ith programming pulse period is between the first verification voltage and a second verification voltage; wherein the first verification voltage is less than the second verification voltage, the third voltage is greater than the second voltage, and the third voltage is less than the first voltage.

If the threshold voltage Vth reached by the first memory cells is between the first verification voltage and the second verification voltage after the ith programming pulse period, it means that the programming speed of the first memory cells is moderate, and therefore, the third voltage greater than the second voltage is applied to the bit lines coupled to the first memory cells to properly reduce the programming speed of the first memory cells to avoid the problem of the overprogramming of the first memory cells.

Third, the first voltage is applied to the bit lines coupled to the first memory cell if the threshold voltage Vth reached by the first memory cells after the ith programming pulse period is greater than or equal to the second verification voltage.

If the threshold voltage Vth reached by the first memory cells is greater than or equal to the second verification voltage after the ith programming pulse period, it means that the programming of the first memory cells is finished, and therefore, the first voltage is applied to the bit lines coupled to the first memory cells to prevent the first memory cells from continuing programming.

Figure 9:
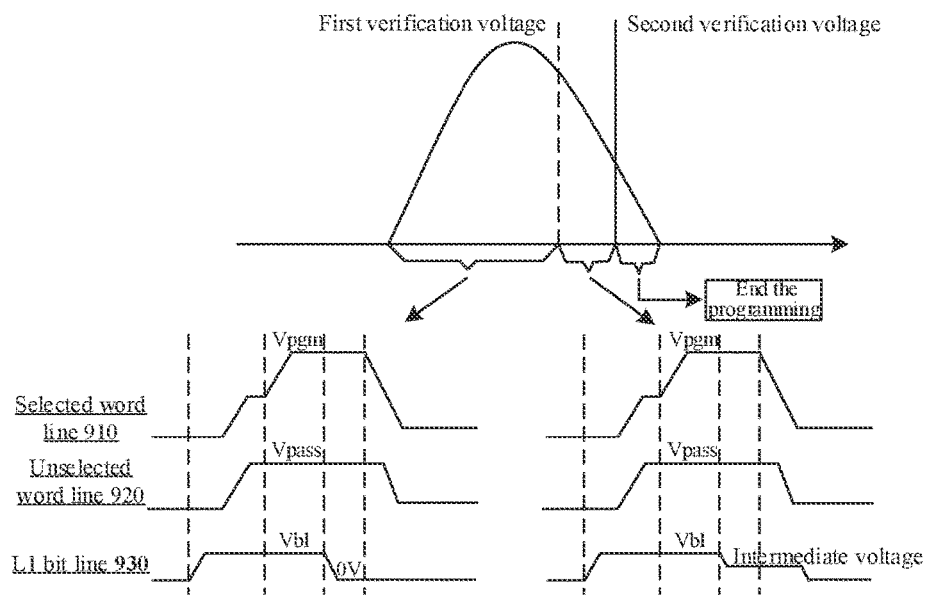
FIG. 9 is a schematic diagram of pulse programming voltage application provided by another implementation of the present application.

Schematically, as shown in FIG. 9, after the ith programming pulse period, the programming verification is performed on the first memory cells to determine the threshold voltage reached by the first memory cells. When the threshold voltage reached by the first memory cells is less than the first verification voltage, as shown in FIG. 9, a programming voltage is applied to a selected word line 910 coupled to the first memory cells and Vpass is applied to an unselected word line 920, in the (i+1)th programming pulse period; and a first voltage Vb1 is applied to an L1 bit line 930 coupled to the first memory cells at the first stage of the (i+1)th programming pulse period, and a second voltage 0V is applied to an L1 bit line 930 at the second stage. When the threshold voltage reached by the first memory cells is greater than the first verification voltage and less than the second verification voltage, as shown in FIG. 9, the programming voltage is applied to the selected word line 910 coupled to the first memory cells and Vpass is applied to the unselected word line 920, in the (i+1) programming pulse period; the first voltage Vb1 is applied to the L i bit line 930 coupled to the first memory cells at the first stage of the (i+1)th programming pulse period, and a third voltage, i.e., an intermediate voltage between the first voltage Vb1 and the second voltage 0V, is applied to the L1 bit line 930 at the second stage. When the threshold voltage reached by the first memory cells is greater than or equal to the second verification voltage, as shown in FIG. 9, the programming of the first memory cells is finished.

To sum up, for the programming method provided by this implementation, in the process of programming the first memory cells, for the first programmed state that may lead to overprogramming, two-stage programming is performed on the first memory cells corresponding to the first programmed state, where one stage is to perform the programming suppression on the memory cells, and the other stage is to perform the pulse programming on the memory cells, thereby reducing a programming speed of the memory cells corresponding to the first programmed state. In the event of a high programming voltage is applied, a probability of the overprogramming of the memory cells corresponding to the first programmed state can also be reduced.

The programming method provided by this implementation determines the voltage being applied to the memory cells in the (i+1)th programming pulse period through relationships of the threshold voltage with the first verification voltage and the second verification voltage, determined through the programming verification for the ith programming pulse period, to avoid an overprogramming situation in the subsequent programming pulse periods due to too high voltage reached in the ith programming pulse period, and meanwhile to avoid the problem of low programming efficiency due to too low voltage reached in the ith programming pulse period at the same time, which improves the programming accuracy.

Figure 10:
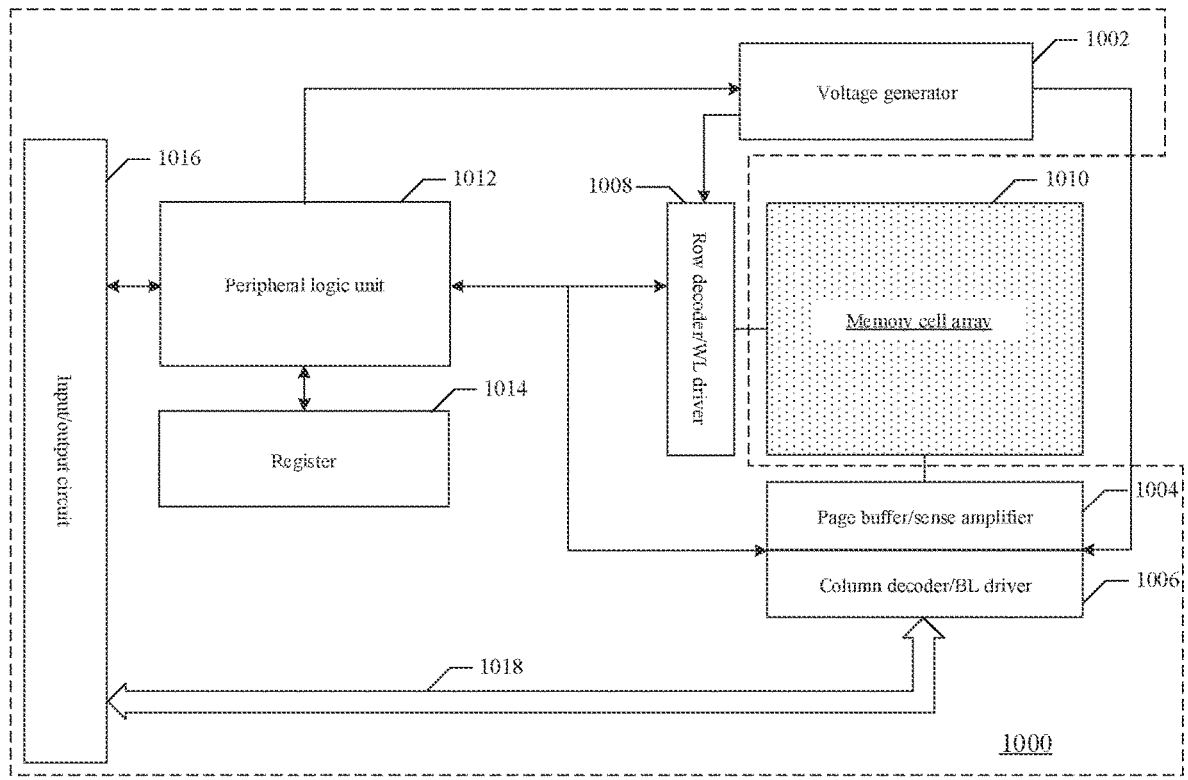
FIG. 10 is a schematic structural diagram of a memory provided by one implementation of the present application.

FIG. 10 is a schematic structural diagram of a memory provided by implementations of the present application. As shown in FIG. 10, the memory comprises a peripheral circuit 1000 and a memory cell array 1010.

The peripheral circuit 1000 is used to write and read data to and from the memory cell array 1010.

The peripheral circuit 1000 comprises a voltage generator 1002, a page buffer/sense amplifier 1004, a column decoder/bit line (BL) driver 1006, a row decoder/word line (WL) driver 1008, a peripheral logic unit 1012, a register 1014, an input/output circuit 1016 and a data bus 1018. It is understood that in some examples, additional peripheral circuits not shown in FIG. 10 may be included as well.

The page buffer/sense amplifier 1004 may be configured to read and program (write) data from and to the memory cell array 1010 according to control signals from the peripheral logic unit 1012. In one example, the page buffer/sense amplifier 1004 may store one page of programming data (write data) to be programmed into one page of the memory cell array 1010. In another example, the page buffer/sense amplifier 1004 may perform programming verification operations to ensure that the data has been properly programmed into the memory cells that are coupled to the selected word lines. In yet another example, the page buffer/sense amplifier 1004 may also sense a low power signal from the bit lines that represents a data bit stored in the memory cells, and amplify a small voltage swing to a recognizable logic level in a read operation.

The column decoder/bit line driver 1006 may be configured to be controlled by the peripheral logic unit 1012 and select one or more NAND strings by applying bit line voltages generated from the voltage generator 1002.

The row decoder/word line driver 1008 may be configured to be controlled by the peripheral logic unit 1012 and select/unselect blocks of the memory cell array 1010 and select/unselect word lines of the blocks. The row decoder/word line driver 1008 may be further configured to drive the word lines using word line voltages ($V_{WL}$) generated from the voltage generator 1002. In some implementations, the row decoder/word line driver 1008 may also select/unselect and drive source select gate lines and drain select gate lines. Schematically, the row decoder/word line driver 1008 is configured to perform erasing operations on the memory cells coupled to (one or more) selected word lines.

The voltage generator 1002 may be configured to be controlled by the peripheral logic unit 1012 and generate a word line voltage (such as, a read voltage, a programming voltage, a pass voltage, a local voltage, a verification voltage, etc.), a bit line voltage and a source line voltage to be supplied to the memory cell array 1010.

The peripheral logic unit 1012 may be coupled to each peripheral circuit described above and configured to control the operations of each peripheral circuit. The peripheral logic unit 1012 comprises a control circuit as shown in FIG. 10 above.

The register 1014 may be coupled to the peripheral logic unit 1012 and include a state register, a command register, and an address register for storing state information, command operation codes (OP codes), and command addresses for controlling the operations of each peripheral circuit. The input/output circuit 1016 may be coupled to the peripheral logic unit 1012, and act as a control buffer to buffer and relay control commands received from a host (not shown) to the peripheral logic unit 1012 and to buffer and relay state information received from the peripheral logic unit 1012 to the host. The input/output circuit 1016 may also be coupled to the column decoder/bit line driver 1006 via a data bus 1018 and act as a data input/output interface and a data buffer to buffer and relay the data to and from the memory cell array 1010.

It is to be emphasized that, the peripheral circuit 1000 is configured to perform the programming method of the memory provided by the implementations of the present disclosure on selected rows of memory cells of a plurality of rows of memory cells.

Figure 11:
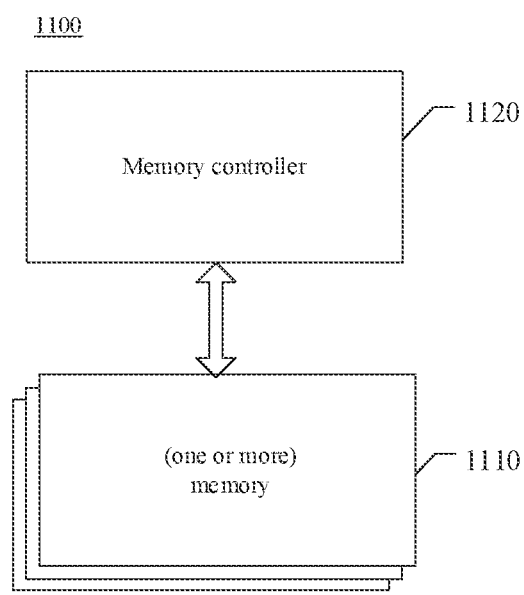
FIG. 11 is a schematic structural diagram of a storage system provided by one implementation of the present application.

FIG. 11 is a structural block diagram of a storage system provided by one implementation of the present application. As shown in FIG. 11, the storage system 1100 comprises:

one or more memories 1110, and a memory controller 1120 coupled to the memories 1110 and configured to control the memories 1110.

The storage system 1100 may be a mobile phone, a desktop computer, a laptop computer, a tablet, a vehicle computer, a gaming console, a printer, a positioning device, a wearable electronic device, a smart sensor, a virtual reality (VR) device, an augmented reality (AR) device, or any other suitable electronic devices having storages therein.

In some implementations, the storage system 1100 may comprise a host and a storage subsystem, where the storage subsystem has one or more memories 1110 and a memory controller 1120. The host may be a processor (e.g., a central processing unit (CPU)) or a system on chip (SOC) (e.g., an application processor (AP)) of an electronic device. The host may be configured to send data to the memories 1110. Alternatively, the host may be configured to receive data from the memories 1110.

According to some implementations, the memory controller 1120 is further coupled to the host. The memory controller 1120 can manage the data stored in memories 1110 and communicate with the host.

In some implementations, the memory controller 1120 is designed for operating in a low duty-cycle environment such as Secure Digital (SD) cards, Compact Flash (CF) cards, Universal Serial Bus (USB) flash drives, or other media for use in electronic devices, such as personal computers, digital cameras, mobile phones, etc.

In some implementations, the memory controller 1120 is designed for operating in high duty-cycle environment Solid-State Drives (SSD) or embedded Multi-Media Cards (eMMC). SSD or eMMC is used as a data storage for mobile devices, such as smartphones, tablets, laptop computers, etc., and enterprise arrays.

The memory controller 1120 may be configured to control operations of the memories 1110, such as reading, erasing, and programming operations. The memory controller 1120 may be further configured to manage various functions with respect to data stored or to be stored in the memories 1110, including, but not limited to bad-block management, garbage collection, logical-to-physical address conversion, wear leveling, etc. In some implementations, the memory controller 1120 is further configured to process error correction codes (ECC) with respect to the data read from or written to the memories 1110.

The memory controller 1120 may further perform any other suitable functions as well, for example, formatting the memories 1110. The memory controller 1120 may communicate with an external device according to a particular communication protocol.

The memory controller 1120 and the one or more memories 1110 can be integrated into various types of storage devices, for example, be included in the same package, such as a Universal Flash Storage (UFS) package or an eMMC package. That is, the memory system 1100 can be implemented and packaged into different types of terminal electronic products.

Schematically, the memory controller 1120 and a single memory 1110 may be integrated into a memory card. The memory card may include a PC card (PCMCIA, Personal Computer Memory Card International Association), a CF card, a Smart Media (SM) card, a memory stick, a Multimedia card (MMC, RS-MMC, MMCmicro), an SD card (SD, miniSD, microSD, SDHC), a UFS, etc. The memory card may further include a memory card connector coupling the memory card with the host.

Schematically, the memory controller 1120 and multiple memories 1110 may be integrated into a solid-state drive (SSD). In some implementations, the storage capacity and/or the operation speed of the solid-state drive are greater than those of the memory card.

It can be understood that the memory controller 1120 may perform the programming method of the memory provided by any one of the implementations of the present disclosure.

Implementations of the present application provide a control circuit which comprises a programmable logic circuit and/or a program instruction, where the control circuit may be used to achieve the programming method of the memory provided by the preceding implementations of the present application.

Schematically, the memory 910 as shown in FIG. 9 comprises an array and a peripheral circuit, where the array comprises a plurality of blocks, and the blocks comprise memory cells; the peripheral circuit is configured to perform increment step pulse programming ISPP on first memory cells to be programmed to a first programmed state, wherein programming suppression is performed on the first memory cells at first stage of a first programming pulse period of the ISPP, and pulse programming is performed on the first memory cells at second stage of the first programming pulse period.

In one implementation, the peripheral circuit is further configured to perform programming suppression on the first memory cells at first stage of a plurality of programming pulse periods of the ISPP, and perform pulse programming on the first memory cells at second stage of the plurality of programming pulse periods.

In one implementation, the peripheral circuit is further configured to perform programming suppression on the first memory cells at the first stage of the first programming pulse period if a programming voltage applied to word lines coupled to the first memory cells is greater than a first preset voltage.

In one implementation, the peripheral circuit is further configured to apply a first voltage to the bit lines coupled to the first memory cells and a programming voltage to the word lines coupled to the first memory cells, at the first stage of the first programming pulse period; the peripheral circuit is further configured to apply a second voltage to the bit lines coupled to the first memory cells and the programming voltage to the word lines coupled to the first memory cells, at second stage of the first programming pulse period; wherein the first voltage is higher than the second voltage.

In one implementation, the peripheral circuit is further configured to perform ISPP on second memory cells to be programmed to a second programmed state, wherein: a second voltage is applied to bit lines coupled to the second memory cells in the first programming pulse period of the ISPP, where a threshold voltage of the second programmed state memory cells is greater than a threshold voltage of the first programmed state memory cells.

In one implementation, the peripheral circuit is further configured to perform programming verification on the first memory cells after an ith programming pulse period is finished, i being a positive integer; apply a first voltage to the bit lines coupled to the first memory cells at first stage of an (i+1)th programming pulse period; and apply a voltage to the bit lines coupled to the first memory cells for pulse programming, at second stage of the (i+1)th programming pulse period, based on a programming voltage reached by the first memory cells after the ith programming pulse period.

In one implementation, the peripheral circuit is further configured to apply a second voltage to the bit lines coupled to the first memory cells at the second stage of the (i+1)th programming pulse period if the programming voltage reached by the first memory cells after the ith programming pulse period is less than a first verification voltage; the peripheral circuit is further configured to apply a third voltage to the bit lines coupled to the first memory cells at the second stage of the (i+1)th programming pulse period if the programming voltage reached by the first memory cells after the ith programming pulse period is between the first verification voltage and a second verification voltage, where the first verification voltage is less than the second verification voltage, the third voltage is greater than the second voltage, and the third voltage is less than the first voltage; the peripheral circuit is further configured to apply the first voltage to the bit lines coupled to the first memory cells if the programming voltage reached by the first memory cells after the ith programming pulse period is greater than or equal to the second verification voltage.

In one implementation, the first stage is before the second stage in the first programming pulse period; or the first stage is after the second stage in the first programming pulse period.

To sum up, for the memory provided by this implementation, in the process of programming the first memory cells, for the first programmed state that may lead to overprogramming, two-stage programming is performed on the first memory cells corresponding to the first programmed state, where one stage is to perform programming suppression on the memory cells, and the other stage is to perform pulse programming on the memory cells, thereby reducing a programming speed of the memory cells corresponding to the first programmed state. if a high programming voltage is applied, the probability of the overprogramming of the memory cells corresponding to the first programmed state can also be reduced.

Implementations of the present application provide an electronic device which comprises one or more memories as provided in the implementations of the present application, and a memory controller coupled to the memories and configured to control the memories.

In the present application, the terms "first" and "second" are only for the purpose of description, and cannot be construed as indicating or implying relative importance. The term "at least one" means one or more, and the term "a plurality of" means two or more, unless otherwise defined clearly.

The term "and/or" in the present application is only an association relationship for describing associated objects, and means that three relationships may exist. For example, A and/or B may represent the presence of A alone, the presence of A and B simultaneously, and the presence of B alone. In addition, the character "/" herein generally means that associated objects before and after it have a relationship of "or".

The above descriptions are only implementations of the present application, and are not used to limit the present application. As long as within the spirits and principles of the present application, any amendments, equivalent substitutions and improvements and the like shall be encompassed within the protection scope of the present application.

What is claimed is:

1. A method for programming a memory, comprising:
performing a plurality periods of first increment step pulse programming (ISPP) on first memory cells to be programmed to a first programmed state, comprising:
in response to a programming voltage applied to a word line coupled to the first memory cells is greater than a first preset voltage, at a first stage of a first period of the first ISPP, performing programming suppression to the first memory cells; and
at a second stage of the first period of the first ISPP, performing pulse programming to the first memory cells.

2. The method of claim 1, further comprising:
at each first stage of the plurality periods of the first ISPP, performing programming suppression to the first memory cells; and
at each second stage of the plurality periods of the first ISPP, performing pulse programming to the first memory cells.

3. The method of claim 1, wherein:
performing the programming suppression to the first memory cells comprises: at the first stage of the first period of the first ISPP, applying a first voltage to bit lines coupled to the first memory cells and a programming voltage to a word line coupled to the first memory cells;
performing pulse programming to the first memory cells comprises: at the second stage of the first period of the first ISPP, applying a second voltage to the bit lines and applying the programming voltage to the word line;
the first voltage is higher than the second voltage.

4. The method of claim 3, further comprising:
performing a plurality periods of second ISPP on second memory cells to be programmed to a second programmed state, comprising:
in the first period of the second ISPP, applying the second voltage to bit lines coupled to the second memory cells;
wherein a second threshold voltage of the second memory cells in the second programmed state is greater than a first threshold voltage of the first memory cells in the first programmed state.

5. The method of claim 1, further comprising:
after an ith period of the first ISPP, performing programming verification on the first memory cells, wherein i is a positive integer;
at a first stage of an (i+1)th period of the first ISPP, applying a first voltage to bit lines coupled to the first memory cells; and
at a second stage of the (i+1)th period of the first ISPP, applying at least one voltage to the bit lines coupled to the first memory cells for pulse programming, based on a programming voltage of the first memory cells reached after the ith period of the first ISPP.

6. The method of claim 5, wherein applying the at least one voltage to the at least one bit line comprises:

at the second stage of the (i+1)th period of the first ISPP, when the programming voltage of the first memory cells reached after the ith period of the first ISPP is less than a first verification voltage, applying a second voltage to the bit lines coupled to the first memory cells;
at the second stage of the (i+1)th period of the first ISPP, when the programming voltage of the first memory cells reached after the ith period of the first ISPP is greater than the first verification voltage and less than a second verification voltage, applying a third voltage to the bit lines coupled to the first memory cells; and
at the second stage of the (i+1)th period of the first ISPP, when the programming voltage of the first memory cells reached after the ith period of the first ISPP is greater than or equal to the second verification voltage, applying the first voltage to the bit lines coupled to the first memory cells;
wherein the third voltage is greater than the second voltage and less than the first voltage.

7. The method of claim 1, wherein,
the first stage of the first period is before the second stage of the first period; or
the first stage of the first period is after the second stage of the first period.

8. A memory device, comprising:
a memory array comprising a plurality of memory cells; and
a peripheral circuit coupled with the memory array and configured to:
perform a plurality periods of first increment step pulse programming (ISPP) on first memory cells to be programmed to a first programmed state, comprising:
in response to a programming voltage applied to a word line coupled to the first memory cells is greater than a first preset voltage, at a first stage of a first period of the first ISPP, perform programming suppression to the first memory cells; and
at a second stage of the first period of the first ISPP, perform pulse programming to the first memory cells.

9. The memory device of claim 8, wherein the peripheral circuit is further configured to:
at each first stage of the plurality periods of the first ISPP, perform programming suppression to the first memory cells; and
at each second stage of the plurality periods of the first ISPP, perform pulse programming to the first memory cells.

10. The memory device of claim 8, wherein the peripheral circuit is further configured to:
at the first stage of the first period of the first ISPP, apply a first voltage to bit lines coupled to the first memory cells and a programming voltage to a word line coupled to the first memory cells;
at the second stage of the first period of the first ISPP, apply a second voltage to the bit lines and the programming voltage to the word line;
wherein the first voltage is higher than the second voltage.

11. The memory device of claim 10, wherein the peripheral circuit is further configured to:
perform a plurality periods of second ISPP on second memory cells to be programmed to a second programmed state, comprising:

in the first period of the second ISPP, apply the second voltage to bit lines coupled to the second memory cells;

wherein a second threshold voltage of the second memory cells in the second programmed state is greater than a first threshold voltage of the first memory cells in the first programmed state.

12. The memory device of claim 8, wherein the peripheral circuit is further configured to:

after an ith period of the first ISPP, perform programming verification on the first memory cells, wherein i is a positive integer;

at a first stage of an (i+1)th period of the first ISPP, apply a first voltage to bit lines coupled to the first memory cells; and at a second stage of the (i+1)th period of the first ISPP, apply at least one voltage to the bit lines coupled to the first memory cells for pulse programming, based on a programming voltage of the first memory cells reached after the ith period of the first ISPP.

13. The memory device of claim 12, wherein the peripheral circuit is further configured to:

at the second stage of the (i+1)th period of the first ISPP, when the programming voltage of the first memory cells reached after the ith period of the first ISPP is less than a first verification voltage, apply a second voltage to the bit lines coupled to the first memory cells;

at the second stage of the (i+1)th period of the first ISPP, when the programming voltage of the first memory cells reached after the ith period of the first ISPP is greater than the first verification voltage and less than a second verification voltage, apply a third voltage to the bit lines coupled to the first memory cells; and at the second stage of the (i+1)th period of the first ISPP, when the programming voltage of the first memory cells reached after the ith period of the first ISPP is greater than or equal to the second verification voltage, apply the first voltage to the bit lines coupled to the first memory cells;

wherein the third voltage is greater than the second voltage and less than the first voltage.

14. A memory system, comprising:

at least one memory device each comprising:
 a memory array comprising a plurality of memory cells, and
 a peripheral circuit coupled with the memory array and configured to:
  perform a plurality periods of first increment step pulse programming (ISPP) on first memory cells to be programmed to a first programmed state, comprising:
   in response to a programming voltage applied to a word line coupled to the first memory cells is greater than a first preset voltage, at a first stage of a first period of the first ISPP, perform programming suppression to the first memory cells, and
   at a second stage of the first period of the first ISPP, perform pulse programming to the first memory cells; and
a memory controller coupled to the at least one memory device and configured to control the at least one memory device.

15. The memory system of claim 14, wherein the peripheral circuit is further configured to:

at the first stage of the first period of the first ISPP, apply a first voltage to bit lines coupled to the first memory cells;

at the second stage of the first period of the first ISPP, apply a second voltage to the bit lines and the programming voltage to the word line;

wherein the first voltage is higher than the second voltage.

16. The memory system of claim 14, wherein the peripheral circuit is further configured to:

after an ith period of the first ISPP, perform programming verification on the first memory cells, wherein i is a positive integer;

at a first stage of an (i+1)th period of the first ISPP, apply a first voltage to bit lines coupled to the first memory cells; and at a second stage of the (i+1)th period of the first ISPP, apply at least one voltage to the bit lines coupled to the first memory cells for pulse programming, based on a programming voltage of the first memory cells reached after the ith period of the first ISPP.

17. The memory system of claim 16, wherein the peripheral circuit is further configured to:

at the second stage of the (i+1)th period of the first ISPP, when the programming voltage of the first memory cells reached after the ith period of the first ISPP is less than a first verification voltage, apply a second voltage to the bit lines coupled to the first memory cells;

at the second stage of the (i+1)th period of the first ISPP, when the programming voltage of the first memory cells reached after the ith period of the first ISPP is greater than the first verification voltage and less than a second verification voltage, apply a third voltage to the bit lines coupled to the first memory cells; and at the second stage of the (i+1)th period of the first ISPP, when the programming voltage of the first memory cells reached after the ith period of the first ISPP is greater than or equal to the second verification voltage, apply the first voltage to the bit lines coupled to the first memory cells;

wherein the third voltage is greater than the second voltage and less than the first voltage.

18. The memory system of claim 14, wherein the peripheral circuit is further configured to:

at each first stage of the plurality periods of the first ISPP, perform programming suppression to the first memory cells; and at each second stage of the plurality periods of the first ISPP, perform pulse programming to the first memory cells.

19. The memory system of claim 15, wherein the peripheral circuit is further configured to:

perform a plurality periods of second ISPP on second memory cells to be programmed to a second programmed state, comprising:
 in the first period of the second ISPP, apply the second voltage to bit lines coupled to the second memory cells;

wherein a second threshold voltage of the second memory cells in the second programmed state is greater than a first threshold voltage of the first memory cells in the first programmed state.

20. The memory system of claim 14, wherein, the first stage of the first period is before the second stage of the first period; or the first stage of the first period is after the second stage of the first period.

\* \* \* \* \*